(12) United States Patent
Song et al.

(10) Patent No.: US 11,537,901 B2
(45) Date of Patent: Dec. 27, 2022

(54) SYSTEM AND METHOD FOR UNSUPERVISED DOMAIN ADAPTATION WITH MIXUP TRAINING

(71) Applicant: Robert Bosch GmbH, Stuttgart (DE)

(72) Inventors: Huan Song, San Jose, CA (US); Shen Yan, East Lansing, MI (US); Nanxiang Li, San Mateo, CA (US); Lincan Zou, San Jose, CA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 442 days.

(21) Appl. No.: 16/731,209

(22) Filed: Dec. 31, 2019

(65) Prior Publication Data
US 2021/0201159 A1    Jul. 1, 2021

(51) Int. Cl.
*G06N 3/08* (2006.01)
*G06N 3/04* (2006.01)

(52) U.S. Cl.
CPC ............ *G06N 3/088* (2013.01); *G06N 3/0454* (2013.01)

(58) Field of Classification Search
None
See application file for complete search history.

(56) References Cited

U.S. PATENT DOCUMENTS

| | | | | |
|---|---|---|---|---|
| 2018/0024968 A1* | 1/2018 | Clinchant | ............ | G06N 3/0454 706/12 |
| 2019/0354801 A1* | 11/2019 | Sohn | ................... | G06K 9/6234 |
| 2020/0033431 A1* | 1/2020 | Schlemper | ............ | G06V 10/454 |
| 2020/0151457 A1* | 5/2020 | Sharma | ................... | G06K 9/6267 |
| 2020/0167325 A1* | 5/2020 | Carvalho | .................. | G06F 16/28 |

(Continued)

OTHER PUBLICATIONS

Ben-David et al., "A theory of learning from different domains," Mach Learn (2010) 79, Oct. 23, 2019, pp. 151-175.

(Continued)

*Primary Examiner* — Harry S Hong
(74) *Attorney, Agent, or Firm* — Kathy Takeguchi; Maginot, Moore & Beck LLP

(57) ABSTRACT

A system and method for domain adaptation involves a first domain and a second domain. A machine learning system is trained with first sensor data and first label data of the first domain. Second sensor data of a second domain is obtained. Second label data is generated via the machine learning system based on the second sensor data. Inter-domain sensor data is generated by interpolating the first sensor data of the first domain with respect to the second sensor data of the second domain. Inter-domain label data is generated by interpolating first label data of the first domain with respect to second label data of the second domain. The machine learning system is operable to generate inter-domain output data in response to the inter-domain sensor data. Inter-domain loss data is generated based on the inter-domain output data with respect to the inter-domain label data. Parameters of the machine learning system are updated upon optimizing final loss data that includes at least the inter-domain loss data. After domain adaptation, the machine learning system, which is operable in the first domain, is adapted to generate current label data that identifies current sensor data of the second domain.

20 Claims, 3 Drawing Sheets

(56) References Cited

U.S. PATENT DOCUMENTS

2021/0012198 A1* 1/2021 Zhang ................ G06K 9/6228
2021/0133585 A1* 5/2021 Lee ...................... G06V 10/82

OTHER PUBLICATIONS

Berthelot et al., "MixMatch: A Holistic Approach to Semi-Supervised Learning," 33rd Conference on Neural Information Processing Systems (NeurIPS 2019), Vancouver, Canada, pp. 1-11.
Bousmalis et al., "Domain Separation Networks," 30th Conference on Neural Information Processing Systems (NIPS 2016), Barcelona, Spain, pp. 1-9.
Chen et al., "Joint Domain Alignment and Discriminative Feature Learning for Unsupervised Deep Domain Adaptation," The Thirty-Third AAAI Conference on Artificial Intelligence (AAAI-19), 2019, pp. 3296-3303.
Ganin et al., "Domain-Adversarial Training of Neural Networks," Journal of Machine Learning Research, 17, (2016) pp. 1-35.
French et al., "Self-ensembling for visual domain adaptation," arXiv:1706.05208v4 [cs.CV] Sep. 23, 2018, pp. 1-20.
Ghifary et al., "Deep Reconstruction-Classification Networks for Unsupervised Domain Adaptation," arXvi: 1607.03516v2 [cs CV] Aug. 1, 2016, pp. 1-21.
Goodfellow et al., "Generative Adversarial Nets," Department d'iformatique et de recherche operationnelle, Universite de Montreal., Montreal QC H3C 3J7, 2014, pp. 1-9.
Hammerla et al., "Deep, Convolutional, and Recurrent Models for Human Activity Recognition using Wearables," arXiv:1604.08880v1 [cs.LG] Apr. 29, 2016, pp. 1-7.
Hoffman et al., "CyCADA: Cycle-Consistent Adversarial Domain Adaptation," arXiv:1711.03213v3 [cs.CV] Dec. 29, 2017, pp. 1-15.
Long et al., "Learning Transferable Features with Deep Adaptation Networks," Proceedings of the 32nd International Conference on Machine Learning, Lille, France, 2015, JMLR: W&CP vol. 37, pp. 1-9.
Long et al., "Deep Transfer Learning with Joint Adaptation Networks," Proceedings of the 34th International Conference on Machine Learning, Sydney, Australia, PMLR 70, arXiv:1605.06636v2 [cs.LG], Aug. 17, 2017, pp. 1-10.
Long et al., "Conditional Adversarial Domain Adaptation," 32nd Conference on Neural Information Processing Systems (NeurIPS 2018), Montreal, Canada, pp. 1-11.
Miyato et al., "Virtual Adversarial Training: A Regularization Method for Supervised and Semi-Supervised Learning," arXiv:1704 03976V2 [cs ML], Jun. 27, 2018, pp. 1-16.
Mohr et al., "Personal Sensing: Understanding Mental Health Using Ubiquitous Sensors and Machine Learning," Annu Rev Clin Pyschol, May 8, 2017, 13, pp. 23-47.
Ordonez et al., "Deep Convolutional and LSTM Recurrent Neural Networks for Multimodal Wearable Activity Recognition," MDPI, Sensors, 2016, 16,115; doi:10.3390/s16010115, pp. 1-25.
Pei et al., "Multi-Adversarial Domain Adaptation," Association for the Advancement of Artificial Intelligence, 2018, pp. 3934-3941.
Pinheiro et al., "Unsupervised Domain Adaptation with Similarity Learning," Open Access, provided by the Computer Vision Foundation, 2017, pp. 8004-8013.
Saito et al., "Asymmetric Tri-training for Unsupervised Domain Adaptation," arXiv:1702.08400v3 [cs.CV] May 13, 2017, pp. 1-13.
Sankaranarayanan et al., "Generate to Adapt: Aligning Domains using Generative Adversarial Networks," Open Access version, provided by the Computer Vision Foundation, 2017, pp. 8503-8512.
Sener et al., "Learning Transferable Representations for Unsupervised Domain Adaptation," 30th Conference on Neural Information Processing Systems (NIPS 2016), Barcelona, Spain, pp. 1-9.
Shu et al., "A DIRT-T Approach to Unsupervised Domain Adaptation," arXiv:1802.08735v2 [stat.ML], Mar. 19, 2018, pp. 1-19.
Song et al., "Optimizing Kernal Machines using Deep Learning," arXiv:1711.05374v1 [stat.ML] Nov. 15, 2017, pp. 1-12.
Tzeng et al., "Adversarial Discriminative Domain Adaptation," Open Access version, provided by the Computer Vision Foundation, 2017, pp. 7167-7176.
Yousefi et al., "A Survey on Behavior Recognition Using WiFi Channel State Information," IEEE Communications Magazine, Oct. 2017, pp. 98-104.
Zhang et al., "mixup: Beyond Empirical Risk Minimization," arXiv:1710.09412v2 [cs.LG] Apr. 27, 2018, pp. 1-13.
Bousmalis et al., "Unsupervised Pixel-level Domain Adaptation with Generative Adversarial Networks," Open Access version, provided by the Computer Vision Foundation, 2017, pp. 3722-3731.

* cited by examiner

SYSTEM AND METHOD FOR UNSUPERVISED DOMAIN ADAPTATION WITH MIXUP TRAINING

FIELD

This disclosure relates generally to machine learning systems.

BACKGROUND

Deep learning systems typically rely on abundant data and extensive human labeling. As such, during deployment in real-world scenarios, they often face critical challenges when domain shifts occur and the labels under novel distributions are scarce or unavailable. These challenges relate to unsupervised domain adaptation (UDA), which involves utilizing a relevant source domain with abundant labels to build predictive modeling for an unannotated target domain. In addressing these challenges, some work has focused on the adversarial approach of learning domain-invariant features. However, it has been found that this work is insufficient to achieve desirable target domain performance. In addition, there has been other work, which has introduced additional training constraints, such as cluster assumptions. However, these other approaches impose constraints on a chosen domain individually and independently and face several performance drawbacks, as they ignore the important interplay between the source domain and the target domain.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer implemented method for unsupervised domain adaptation involves a first domain and a second domain. The method includes obtaining a machine learning system that is trained with first sensor data and first label data of the first domain. The method includes obtaining second sensor data of the second domain. The method includes generating second label data via the machine learning system based on the second sensor data. The method includes generating inter-domain sensor data by interpolating first sensor data of the first domain with respect to second sensor data of the second domain. The method includes generating inter-domain label data by interpolating first label data of the first domain with respect to second label data of the second domain. The method includes generating inter-domain output data via the machine learning system based on the inter-domain sensor data and the inter-domain label data. The method includes generating inter-domain loss data based on the inter-domain output data with respect to the inter-domain label data. The method includes updating parameters of the machine learning system upon optimizing final loss data. The final loss data includes the inter-domain loss data.

According to at least one aspect, a system includes at least a memory system and a processing system. The memory system includes at least one non-transitory computer readable medium. The memory system includes a domain adaptation application and a machine learning system. The processing system is operatively connected to the memory system. The processing system includes at least one processor that is configured to execute the domain adaptation application to implement a method, which includes generating inter-domain sensor data by interpolating first sensor data of the first domain with respect to second sensor data of the second domain. The method includes generating inter-domain label data by interpolating first label data of the first domain with respect to second label data of the second domain. The method includes generating inter-domain output data via the machine learning system based on the inter-domain sensor data and the inter-domain label data. The method includes generating inter-domain loss data based on the inter-domain output data with respect to the inter-domain label data. The method includes updating parameters of the machine learning system upon minimizing final loss data, which includes at least the inter-domain loss data. The method includes providing the machine learning system for deployment. The machine learning system is adapted to generate current label data that classifies current sensor data of the second domain.

According to at least one aspect, a non-transitory computer readable medium includes computer readable data of a domain adaptation application that, when executed by a processing system with at least one processor, is configured to cause the processing system to implement a method that includes generating inter-domain sensor data by interpolating first sensor data of the first domain with respect to second sensor data of the second domain. The method includes generating inter-domain label data by interpolating first label data of the first domain with respect to second label data of the second domain. The method includes generating inter-domain output data via the machine learning system based on the inter-domain sensor data and the inter-domain label data. The method includes generating inter-domain loss data based on the inter-domain output data with respect to the inter-domain label data. The method includes updating parameters of the machine learning system upon minimizing final loss data, which includes at least the inter-domain loss data. The method includes providing the machine learning system for deployment or employment. The machine learning system is adapted to generate current label data that classifies current sensor data of the second domain.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

In general, this disclosure recognizes that learning domain-invariant representations alone cannot bridge the performance gap between the two domains. Unlike other approaches which aim to solve the UDA problem by addressing a domain independently, the embodiments disclosed herein provide a framework that incorporates both domains in the design of a constraint. By enforcing at least one constraint across domains, the embodiments disclosed herein directly address the target domain performance. In this regard, through the lens of simple yet effective mixup training, the embodiments demonstrate that introducing training constraints across domains can significantly improve the model adaptation performance.

Figure 1:
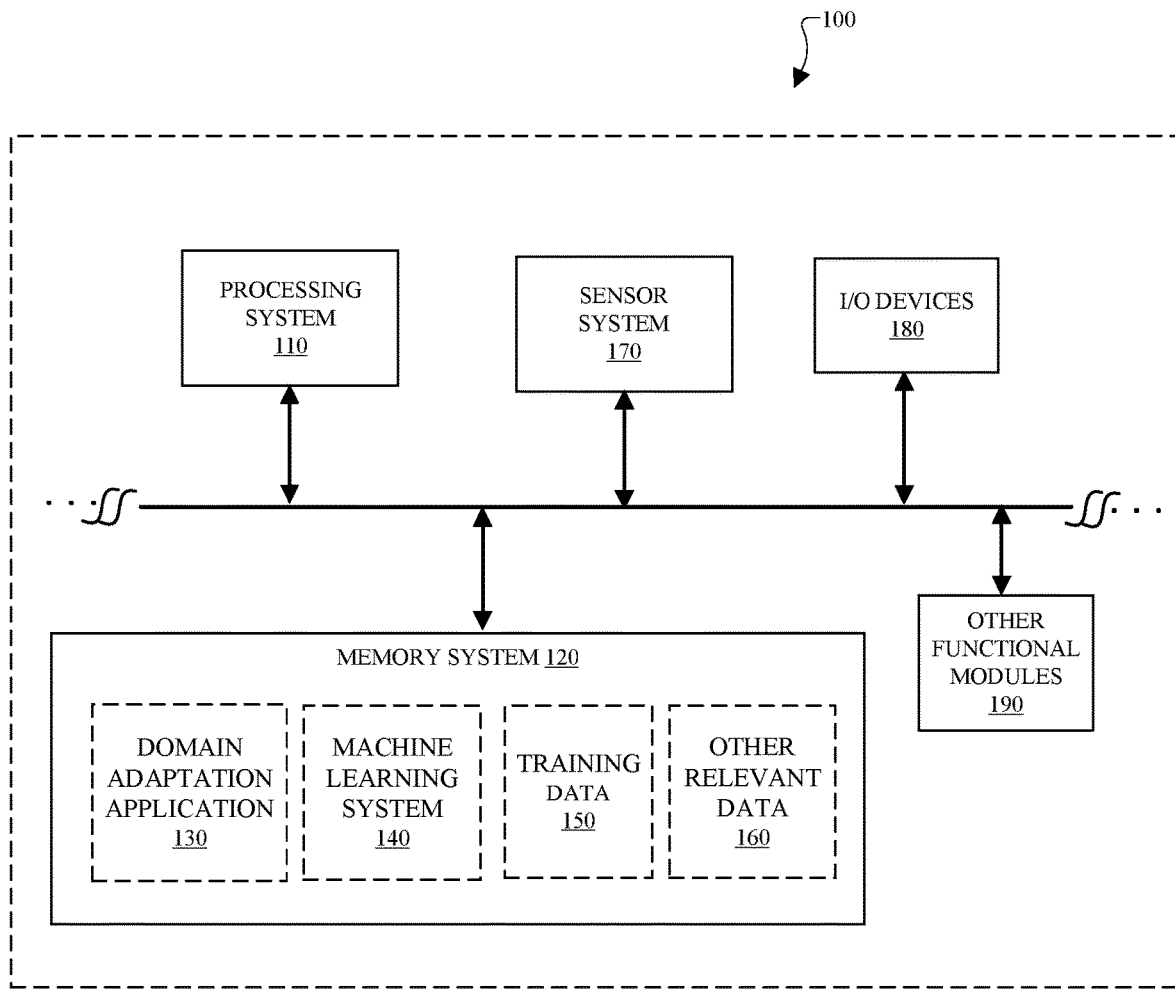
FIG. 1 is a diagram of an example of a system for training a machine learning system according to an example embodiment of this disclosure.

FIG. 1 illustrates an example of a system 100 for providing unsupervised domain adaptation according to an example embodiment. The system 100 includes at least a processing system 110. The processing system 110 includes at least an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 110 is operable to provide the functionality as described herein.

The system 100 includes at least a memory system 120, which is operatively connected to the processing system 110. In an example embodiment, the memory system 120 includes at least one non-transitory computer readable medium, which is configured to store and provide access to various data to enable at least the processing system 110 to perform the operations and functionality, as disclosed herein. In an example embodiment, the memory system 120 comprises a single device or a plurality of devices. The memory system 120 can include electrical, electronic, magnetic, optical, semiconductor, electromagnetic, or any suitable storage technology that is operable with the system 100. For instance, in an example embodiment, the memory system 120 can include random access memory (RAM), read only memory (ROM), flash memory, a disk drive, a memory card, an optical storage device, a magnetic storage device, a memory module, any suitable type of memory device, or any combination thereof. With respect to the processing system 110 and/or other components of the system 100, the memory system 120 is local, remote, or a combination thereof (e.g., partly local and partly remote). For example, the memory system 120 can include at least a cloud-based storage system (e.g. cloud-based database system), which is remote from the processing system 110 and/or other components of the system 100.

The memory system 120 includes at least a domain adaptation application 130, a machine learning system 140, training data 150, and other relevant data 160, which are stored thereon. The domain adaptation application 130 includes computer readable data that, when executed by the processing system 110, is configured to train the machine learning system 140 to adapt from a first domain to a second domain in an effective manner. The computer readable data can include instructions, code, routines, various related data, any software technology, or any number and combination thereof. An example implementation of the domain adaptation application 114 is further discussed with respect to the framework 200 of FIG. 2 and the method 300 of FIG. 3. In addition, the machine learning system 140 includes a convolutional neural network (CNN), a long short-term memory (LSTM) network, a recurrent neural network (RNN), any suitable artificial neural network, or any number and combination thereof. Also, the training data 150 includes a sufficient amount of sensor data of a first domain, label data of the first domain, sensor data of a second domain, label data of the second domain, various mixup formulations (e.g. inter-domain sensor data, inter-domain label data, intra-domain sensor data, intra-domain label data, consistency regularizer data, etc.), various loss data, various weight data, and various parameter data, as well as any related machine learning data that enables the system 100 to provide the unsupervised domain adaptation training as described herein. Meanwhile, the other relevant data 160 provides various data (e.g. operating system, etc.), which enables the system 100 to perform the functions as discussed herein.

In an example embodiment, the system 100 is configured to include at least one sensor system 170. The sensor system 170 includes one or more sensors. For example, the sensor system 170 includes an image sensor, a camera, a radar sensor, a light detection and ranging (LIDAR) sensor, a thermal sensor, an ultrasonic sensor, an infrared sensor, a motion sensor, an audio sensor, an inertial measurement unit (IMU), any suitable sensor, or any combination thereof. The sensor system 110 is operable to communicate with one or more other components (e.g., processing system 110 and memory system 120) of the system 100. More specifically, for example, the processing system 110 is configured to obtain the sensor data directly or indirectly from one or more sensors of the sensor system 170. Upon receiving the sensor data, the processing system 110 is configured to process this sensor data in connection with the domain adaptation application 130 and the machine learning system 140.

In addition, the system 100 includes other components that contribute to the training of the machine learning system 140. For example, as shown in FIG. 1, the memory system 120 is also configured to store other relevant data 160, which relates to operation of the system 100 in relation to one or more components (e.g., sensor system 170, I/O devices 180, and other functional modules 190). In addition, the system 100 is configured to include one or more I/O devices 180 (e.g., display device, keyboard device, speaker device, etc.), which relate to the system 100. Also, the system 100 includes other functional modules 190, such as any appropriate hardware, software, or combination thereof that assist with or contribute to the functioning of the system 100. For example, the other functional modules 190 include communication technology that enables components of the system 100 to communicate with each other as described herein. With at least the configuration discussed in the example of FIG. 1, the system 100 is operable to train the machine learning system 140, which is developed in a first domain ("source domain"), to adapt to a second domain ("target domain").

Figure 2:
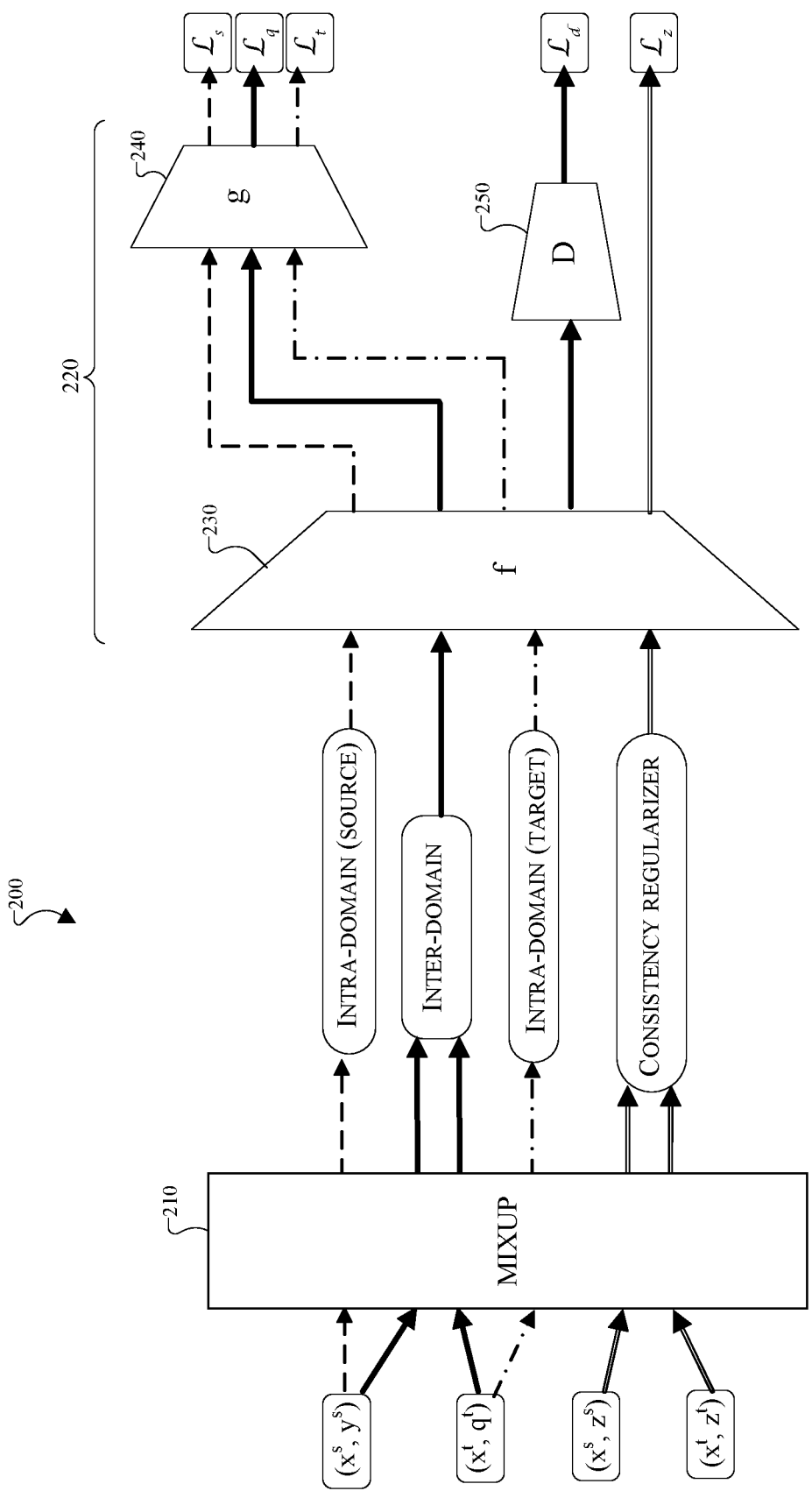
FIG. 2 is a conceptual diagram of a framework for unsupervised domain adaptation with mixup training according to an example embodiment of this disclosure.

FIG. 2 illustrates a conceptual diagram of aspects of the domain adaptation application 130, the machine learning system 140 (e.g., classification model 220 and discriminator 250), and the training data 150. More specifically, FIG. 2 illustrates an inter- and intra-domain mixup training (IIMT) framework 200 for unsupervised domain adaptation according to an example embodiment. In this example, the labeled source domain is denoted as a set $\{(x_i^s, y_i^s)\}_{i=1}^{m_s} \sim S$ and unlabeled target domain is denoted as a set $\{x_i^t\}_{i=1}^{m_t} \sim T$. Also, in this example, one-hot labels are denoted by $y_i$. In addition, the overall classification model 220 is denoted as $h_\theta$ with parameterization by $\theta$. More specifically, in FIG. 2, the classification model 220 is a composite of an embedding encoder 230, which is denoted as $f_{74}$, and an embedding classifier 240, which is denoted as $g_\theta : h = f \circ g$. In an example embodiment, as shown in FIG. 2, the encoder 230 is shared by two domains (i.e. the source domain and the target domain). Also, as shown in FIG. 2, this IIMT framework 200 includes mixup 210, which is a core component and which is imposed both across domains (e.g. inter-domain) and within each domain (e.g., intra-domain for the source domain and intra-domain for the target domain). The IIMT framework 200 also includes a consistency regularizer to better facilitate inter-domain mixup in the presence of a relatively large domain discrepancy. Also, the IIMT framework 200 is configured to provide end-to-end training for its loss data, such as all mixup training losses (e.g., $L_s$, $L_q$, $L_t$, and $L_z$) and the domain adversarial loss (e.g., $L_d$).

Figure 3:
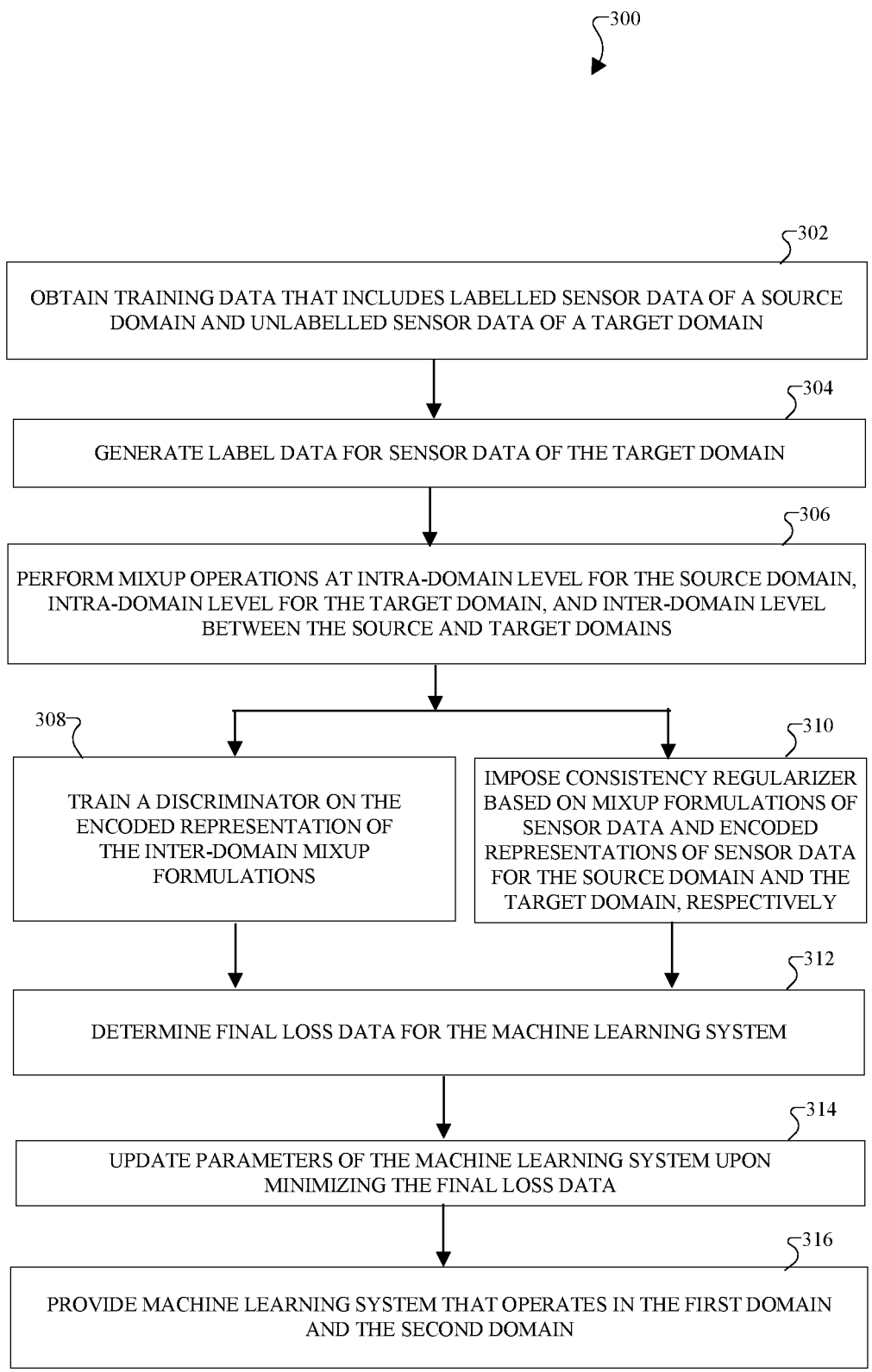
FIG. 3 is a diagram of a method for unsupervised domain adaptation with mixup training according to an example embodiment of this disclosure.

FIG. 3 illustrates an example of a method 300 for providing unsupervised domain adaptation according to an example embodiment. In this case, the method 300 is performed via the domain application program 130, when executed by the processing system 110. However, the system 100 is not limited to implementing this method 300, but may implement other methods (e.g., different steps or different ordering of steps) provided that the other methods capture the functions and objectives of the IIMT framework 200 of FIG. 2. For example, although referenced at step 306, the mixup formulation at the intra-domain level for the source domain can occur before step 304, at the same time as step 304, or whenever the sensor data and the label data for the source domain are available for mixup operations. Moreover, without departing from the spirit and scope of the IIMT framework 200, other modifications can be made to the method 300, which is discussed below.

At step 302, the processing system 110 obtains training data. In an example embodiment, the training data includes annotated sensor data of a source domain. In this case, as shown in FIG. 2, the label data ($y^s$) represent true and/or verified classifications of the sensor data ($x^s$) of the source domain. In addition, as shown in FIG. 2, the processing system 110 obtains sensor data ($x^t$) of a target domain. In this case, the target domain is related to the source domain. The sensor data of the target domain may be unannotated or mostly unannotated.

At step 304, the processing system 110 is configured to generate label data for the sensor data of the target domain. For example, in the event that the processing system obtains sensor data of the target domain that is unannotated, the processing system 110 is configured to generate and utilize inferred labels ($q^t$) as relatively weak supervision for the target domain. In generating these inferred labels ($q^t$), the processing system 110 is configured to integrate data augmentation and entropy reduction into the virtual label (inferred label) generation process. Specifically, the processing system 110 is configured to perform 'K' task dependent stochastic augmentations (e.g. random crop and flipping for images and random scaling for time series) on each data sample to obtain transformed samples $\{\hat{s}_{i,k}\}_{k=1}^{K}$, where K represents an integer value.

Then, the processing system 110 is configured to generate the target domain virtual labels, $q_i$, by performing the calculations of equation (1) and equation (2).

$$\bar{q}_i = \frac{1}{K}\sum_{k=1}^{K} h_\theta(\hat{x}_{i,k}) \qquad (1)$$

$$q_i = \frac{\bar{q}_i^{-\frac{1}{T}}}{\sum_c \bar{q}_{i,c}^{-\frac{1}{T}}} \qquad (2)$$

In the equation above, T denotes the softmax temperature and c is the class index. That is, the processing system 110 averages the class predictions (e.g., virtual labels) over the K augmented inputs to constitute $\bar{q}_i$ and then further performs sharpening to form the virtual labels $q_i$. Using a smaller value, e.g. T<1, produces sharper predicted distributions and helps to reduce the conditional entropy when $q_i$ is used in training. The processing system 110 is now able to use these virtual labels ($q^t$) as annotations for the sensor data ($x^t$) of the target domain.

At step 306, the processing system 110 is configured to perform mixup operations at an intra-domain level for the source domain, an inter-domain level across both source and target domains, and an intra-domain level for the target domain. These mixup operations can be generated in any suitable order, at the same time, or any combination thereof. The processing system 110 is configured to perform mixup operations as discussed below. Furthermore, as shown in FIG. 2, the processing system 110 also performs at least one mixup operation for the consistency regularizer, but that mixup operation includes encoded representations from the encoder 230 and is thus discussed at step 310. With the inclusion of these mixup operations, the processing system 110 encourages linear behavior of the machine learning system 140, as linear interpolation in the raw data leads to linear interpolation of predictions.

Intra-Domain Mixup Operations for the Source Domain

For intra-domain mixup, the processing system 110 is configured to select a pair of samples, e.g., $(x_i^s, y_i^s)$ and $(x_j^s, y_j^s)$, from the source domain. The processing system 110 is configured to perform mixup to enforce linearity consistency within the source domain by generating the following mixup formulations based on the selected pair of source samples, as indicated by the following equations, where $\lambda \in [0,1]$.

$$x_i^{s'} = \lambda' x_i^s + (1-\lambda') x_j^s \qquad (3)$$

$$y_i^{s'} = \lambda' y_i^s + (1-\lambda') y_j^s \qquad (4)$$

After performing this mixup for the source domain, the processing system 110 is configured to provide the mixup formulation of ($x^{s'}$, $y^{s'}$) as training data for the machine learning system 140. In this case, $x^{s'}$ represents intermediate sensor data of the source domain and $y^{s'}$ represents intermediate label data of the source domain. In this regard, this intra-domain mixup formulation serves as a data augmentation strategy, and is also particularly useful for UDA in achieving prediction smoothness in the event of abrupt prediction changes in a vicinity of data samples. In addition, intra-domain mixup imposes strong linearity to enforce separate locally-Lipschitz for this source domain.

Upon obtaining the interpolated results (i.e. the mixup formulations), the processing system 110 is configured, via the machine learning system 140, to generate label data that classifies the interpolated results ($x^{s'}$, $y^{s'}$). Since samples of the same domain follow the similar distribution, there is no need to apply feature-level linearity. The processing system 110 therefore employs these label-level mixup operations for the source domain and determines its corresponding loss data $\mathcal{L}_s$ via the following equation.

$$\mathcal{L}_s = \frac{1}{B}\Sigma_i H(y_i^{s\prime}, h_\theta(x_i^{s\prime})) \tag{5}$$

Inter-Domain Mixup Operations for Source and Target Domains

For inter-domain mixup, the processing system 110 is configured to select a pair of samples, e.g., $(x_i^s, x_i^t)$ and $(y_i^s, q_i^t)$, from their corresponding batches. The processing system 110 is configured to perform mixup to enforce the linearity consistency across the source and target domains by generating the following mixup formulations based on the selected pair of source and target samples, as indicated by the following equations, where $\lambda \in [0,1]$.

$$x_i^{st} = \lambda' x_i^s + (1-\lambda') x_i^t \tag{6}$$

$$q_i^{st} = \lambda' y_i^s + (1-\lambda') q_i^t \tag{7}$$

After performing this mixup across both domains, the processing system 110 is configured to provide the mixup formulation of $(x^{st}, q^{st})$ as training data for the machine learning system 140. In this case, $x^{st}$ represents inter-domain sensor data that results from performing interpolation across both domains and $q^{st}$ represents inter-domain virtual label data that results from performing interpolation across both domains, thereby confronting the important interplay between the source domain and the target domain.

The inter-domain mixup training serves as a key component in the IIMT framework 200. In the training of the classification model 220, the inter-domain mixup provides interpolated labels to enforce linear prediction behavior of the classifier across domains. Compared with training with source labels alone, this mixup training with interpolated labels induces a simplistic inductive bias that can directly improve the generalization capability of the classifier 240 for the target domain. Upon generating label data that classifies the inter-domain mixup formulations, e.g. $(x^{st}, q^{st})$, via the machine learning system 140, the processing system 110 is configured to generate loss data ($\mathcal{L}_q$) via the following equation.

$$\mathcal{L}_q = \frac{1}{B}\Sigma_i H(q_i^{st}, h_\theta(x_i^{st})) \tag{8}$$

In equation (8), B denotes the batch size and H denotes the cross-entropy loss. Also, in equations (6) and (7), the mixup weighting parameter is selected based on the following equations.

$$\lambda \sim \text{Beta}(\alpha, \alpha) \tag{9}$$

$$\lambda' \sim \max(\lambda, 1-\lambda) \tag{10}$$

In equation (9), Beta refers to beta distribution with the shared shape parameter $\alpha$. When $\alpha$ is set to closer to 1, there is a larger probability to choose a medium value of $\lambda$ from range [0; 1], leading to higher level of interpolation between the two domains. Also, due to equation (10), $\lambda'$ is always over 0.5 to ensure the source domain is dominant. Similarly the mixup dominated by the target domain can be generated via switching $x^s$ and $x^t$ in equation (6), which forms $(x^{ts}, q^{ts})$. With $(x^{ts}, q^{ts})$, the processing system 110 is configured to use the mean square error (MSE) loss as it is more tolerant to false virtual labels in the target domain.

Intra-Domain Mixup Operations for Target Domain

For intra-domain mixup, the processing system 110 is configured to select a pair of samples, e.g., $(x_i^t, q_i^t)$ and $(x_j^t, q_j^t)$, from the target domain. As aforementioned, with respect to the target domain, the labels (e.g., $q_i^t$ and $q_j^t$) are inferred labels, which are generated by the machine learning system 140 based on the sensor data of the target domain and are thus predicted labels (i.e., not ground-truth labels). The processing system 110 is configured to perform mixup to enforce linearity consistency within the target domain by generating the following mixup formulations based on the selected pair of target samples, as indicated by the following equations, where $\lambda \in [0,1]$.

$$x_i^{t\prime} = \lambda' x_i^t + (1-\lambda') x_j^t \tag{11}$$

$$q_i^{t\prime} = \lambda' q_i^t + (1-\lambda') q_j^t \tag{12}$$

After performing this mixup for the target domain, the processing system 110 is configured to provide the mixup formulation of $(x^{t\prime}, y^{t\prime})$ as training data for the machine learning system 140. In this case, $x^{t\prime}$ represents intermediary sensor data of the target domain and $y^{t\prime}$ represents intermediary virtual label data of the target domain. In this regard, this intra-domain mixup formulation serves as a data augmentation strategy, and is also particularly useful for UDA in achieving prediction smoothness in the event of abrupt prediction changes in a vicinity of data samples. In addition, intra-domain mixup imposes strong linearity to enforce separate locally-Lipschitz for this target domain.

Upon obtaining the interpolated results (i.e. the mixup formulations), the processing system 110 is configured, via the machine learning system 140, to generate label data that classifies the interpolated results $(x^{t\prime}, y^{t\prime})$. Since samples of the same domain follow the similar distribution, there is no need to apply feature-level linearity. The processing system 110 therefore employs these label-level mixup operations for the target domain and determines its corresponding loss data $\mathcal{L}_t$ via the following equation.

$$\mathcal{L}_t = \frac{1}{B}\Sigma_i \|q_i^{t\prime} - h_\theta(x_i^{t\prime})\|_2^2 \tag{13}$$

At step 308, the processing system 110 is configured to employ standard domain adversarial training to reduce the domain discrepancy. In an example embodiment, the implementation is restricted to the domain adversarial neural network (DANN) framework to focus on evaluating the mixup linearity constraints. Other embodiments may include other and/or more sophisticated formulations than the DANN framework. More specifically, as shown in FIG. 2, the shared embedding encoder 230 (e.g., generator) and the discriminator 250 are trained under the adversarial objective such that the encoder 230 learns to generate domain-invariant features. In this regard, the discriminator 250 is denoted as D: $Z \mapsto (0,1)$, where 0/1 annotates the binary domain label. With DANN, the processing system 110 determines the domain adversarial loss ($L_d$) via the following equation:

$$\mathcal{L}_d = \frac{1}{B}\Sigma_i \ln D(f_\theta(x_i^{st})) + \ln(1 - D(f_\theta(x_i^{st}))) \tag{14}$$

As shown in FIG. 2 and as indicated in equation (14), the processing system 110 conducts the discriminator training based on the encoded representations of the mixup formulations between the source and target samples, instead of directly on the original samples themselves.

At step 310, the processing system 110 is configured to impose a consistency regularizer for the latent features to better facilitate inter-domain mixup training. The consistency regularizer is particularly effective in the event that there is a relatively large domain discrepancy, as the linearity constraint imposed by inter-domain mixup may be less effective. Specifically, when the heterogeneous raw inputs are interpolated in equation (6), then there may be some difficulty in forcing the classification model 220 to produce corresponding interpolated predictions. At the same time, the joint training with domain adversarial loss (step 308) for feature-level domain confusion can add to this training difficulty. The processing system 110 thus imposes the consistency regularizer to combat these challenges. More specifically, as shown in FIG. 2, the processing system 110 generates mixup formulations for the consistency regularizer and then trains the machine learning system 140 based on these mixup formulations, as discussed below.

For the consistency regularizer, the processing system 110 is configured to select a pair of samples, e.g., $(x_i^s, z_i^s)$ and $(x_i^t, z_i^t)$, from their corresponding batches and from corresponding output data (e.g., encoded representations) of the encoder 230. The processing system 110 is configured to perform mixup to enforce the linearity consistency for the inter-domain mixup by generating the following mixup formulations based on the selected pair of samples, as indicated by the following equations where $\lambda \in [0,1]$.

$$x_i^{st} = \lambda' x_i^s + (1-\lambda') x_i^t \qquad (15)$$

$$z_i^{st} \lambda' f_\theta(x_i^s) + (1-\lambda') f_\theta(x_i^t) \qquad (16)$$

In equation (16), the processing system 110 denotes Z as the embedding space induced by f and $z \in Z$ in defining the regularizer term $z_i^{st}$. Equation (15) is the same as equation (6) in that they both generate inter-domain sensor data ($x^{st}$), i.e., sensor data that is interpolated based on sensor data from the source domain and sensor data from the target domain. In this regard, the processing system 110 is configured to use the $x_i^{st}$ from the mixup performed at step 306. After performing these mixups, the processing system 110 is configured to provide each mixup formulation of ($x_i^{st}, z_i^{st}$) as training data for the machine learning system 140.

As shown in FIG. 2, the processing system 110 trains at least the encoder 230 on each mixup formulations ($x_i^{st}, z_i^{st}$) and computes the loss function based on this training. In this example, the processing system 110 generates the loss data for the consistency regularizer, which is represented as $\mathcal{L}_z$ in the following equation.

$$\mathcal{L}_z = \frac{1}{B} \Sigma_i \| z_i^{st} - f_\theta(x_i^{st}) \|_2^2 \qquad (17)$$

As indicated in equation (17), the consistency regularizer pushes the mixed feature closer to the feature of the mixed input through the MSE loss between the two vectors. In this way, the processing system 110 imposes the linearity constraint to be enforced also at the feature level. The efficacy of this consistency regularizer is that when equation (17) is enforced and the training data ($z_i^{st}, f_\theta(x_i^{st})$) are passed through the shallow classifier 240, then the linearity in the model prediction is satisfied more easily. Furthermore, when the processing system 110 imposes the linearity smoothness of features across domains, then this action may support the domain confusion loss. Furthermore, similar to the handling of equation (6), $z_i^s$ and $z_i^t$ can also be switched in equation (16) to form $z_i^{ts}$ as a modification such that the machine learning system 140 is provided with ($x_i^{ts}, z_i^{ts}$) as training data.

At step 312, the processing system 110 is configured to determine final loss data. More specifically, based on the aforementioned components, the processing system 110 is configured to determine final loss data, which is represented by (L) and expressed by the following equation.

$$L = w_q \mathcal{L}_q + w_d \mathcal{L}_d + w_z \mathcal{L}_z + w_s \mathcal{L}_s + w_t \mathcal{L}_t \qquad (18)$$

Since $\mathcal{L}_t$ only involves virtual labels, $\mathcal{L}_t$ could be easily affected by the uncertainty in the target domain. In this regard, the processing system 110 is configured to set a linear schedule for $w_t$ in training, from 0 to a predefined maximum value. From initial experiments, this algorithm for determining and/or optimizing the final loss data proves to be robust to other weighting parameters. More specifically, in accordance with this algorithm, the processing system 110 is configured to only search $w_t$ while simply fixing all other weightings to 1.

At step 314, the processing system 110 is configured to minimize the final loss data, as determined at step 312. Upon minimizing the final loss data, the processing system 110 is configured to update the parameters of the machine learning system 140. Upon updating the parameters and/or training with the updated parameters, the processing system 110 is configured to determine if the machine learning system 140 meets predetermined threshold criteria and make the machine learning system 140 available for step 316 when the machine learning system 140 satisfies the predetermined threshold criteria.

Upon satisfying the predetermined threshold criteria, the machine learning system 140, which was previously trained to be operable in the first domain, is now adapted via the framework 200 and method 300 to operate in the second domain. In this regard, the machine learning system 140 is configured to generate label data that classifies sensor data of the first domain upon receiving that sensor data as input data and also generate label data that classifies sensor data of the second domain upon receiving that sensor data as input data. That is, the IIMT framework 200 and/or method 300 are effective in further developing an existing machine learning system 140, which has been trained with abundant annotated training data of a first domain, to extend to and operate in a second domain even when annotations for training data of the second domain are scarce or unavailable, thereby providing a more robust and cost effective technical solution to handling domain shifts.

At step 316, the processing system 110 is configured to provide this machine learning system 140 for deployment and/or employment in any suitable application system. For example, the trained machine learning system 140 may be employed by the system 100 of FIG. 1, which may further include an application system that further uses or applies the current label data that is being generated by the trained machine learning system 140 in response to current sensor data. Alternatively, the trained machine learning system 140 may be deployed into another system (not shown), which includes at least some similar components (e.g., sensor system, processing system, etc.) as the system 100 along with an application system that applies the current label data that is being generated by the trained machine learning system 140 in response to current sensor data.

The application system may include software technology, hardware technology, or any combination thereof. As a non-limiting example, the application system may relate to gesture glove technology, which includes sensors that provide sensor data to enable the machine learning system 140 to classify the various gestures. In this example, the machine learning system 140 may be trained to classify the gestures as performed by at least one individual, and further adapted, via the IIMT framework 200 and method 300, to classify the same gestures when performed with some variation by at least one other individual. As other examples, the application system may relate to computer-controlled machines, robots, electronic home appliances, electronic power tools, health/medical technology, autonomous or driver-assisted vehicle technology, security technology, or any suitable technology that includes the employment of machine learning systems 140.

In general, various fields and applications can benefit from being able to extend the capability of a machine learning system that is operable in a first domain to further operate in a second domain, which is related to the first domain. For instance, as a non-limiting example, when there is a change in one sensor to another sensor of the same type (e.g., upgrading one image sensor to another image sensor for enhanced images), there may be some shifts/variations in the sensor data that will be input into the machine learning system 140 based upon the change of sensors. Advantageously, the aforementioned embodiments combat these domain shifts/variations and ensure the machine learning system 140 operates accurately in each of the domains, as well as across both domains.

As discussed herein, the embodiments include a number of advantageous features, as well as benefits. For example, the embodiments are advantageously configured to impose cross-domain training constraints for domain adaptation through the lens of mixup linearity. Also, in order to tackle potentially huge domain discrepancy, the embodiments include a feature-level consistency regularizer to facilitate the inter-domain constraint. Furthermore, the processing system 110 achieves mixup training across domains via inferred labels (or virtual labels) of the target domain. Moreover, as the mixup training and domain adversarial training both progress, the classification model 220 infers virtual labels with increased accuracy. This procedure can be critical to directly improve the generalization of the classifier 240 when applied to the target domain.

Furthermore, the embodiments are advantageous in providing an IIMT framework 200 for UDA with all training constraints unified under the mixup formulations. Moreover, with the IIMT framework 200, the embodiments incorporate both inter- and intra-domain mixup training and thus outperform state-of-the-art methods in diverse application areas (e.g., image classification, human activity recognition, etc.). In this regard, the embodiments disclosed herein tackle issues relating to disparities between the domains for the UDA problem. Also, the embodiments may be modified or enhanced based on the commonality and relationship between inter-domain mixup linearity and domain discriminator. Further, the teachings disclosed herein may extend to and be applied in advancing general time-series analysis.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer implemented method for unsupervised domain adaptation involving a first domain and a second domain, the method comprising:

obtaining a machine learning system that is trained with first sensor data and first label data of the first domain;

obtaining second sensor data of the second domain;

generating second label data, via the machine learning system, based on the second sensor data;

generating inter-domain sensor data by interpolating first sensor data of the first domain with respect to second sensor data of the second domain;

generating inter-domain label data by interpolating first label data of the first domain with respect to second label data of the second domain;

generating, via the machine learning system, inter-domain output databased on the inter-domain sensor data;

generating inter-domain loss data based on the inter-domain output data with respect to the inter-domain label data;

updating parameters of the machine learning system upon optimizing final loss data, the final loss data including the inter-domain loss data; and generating, via the machine learning system, current label data that classifies current sensor data of the second domain.

2. The computer implemented method of claim 1, further comprising:

obtaining a first encoded representation of the first sensor data and a second encoded representation of the second sensor data;

generating an intermediate encoded representation data by interpolating the first encoded representation with respect to the second encoded representation;

encoding the intermediate encoded representation data to generate a third encoded representation; and generating regularizer loss data based on the third encoded representation with respect to the inter-domain sensor data, wherein the final loss data includes the regularizer loss data.

3. The computer implemented method of claim 1, wherein the second label data are predicted label data that are generated by the machine learning system in response to the second sensor data.

4. The computer implemented method of claim 1, further comprising:

training a discriminator based on an encoded representation of the inter-domain sensor data and an encoded representation of the inter-domain label data; and generating domain adversarial loss data based on output data from the discriminator, wherein the final loss data includes the domain adversarial loss data.

5. The computer implemented method of claim 1, further comprising:
generating intermediate sensor data by interpolating pairs of first sensor data of the first domain;
generating intermediate label data by interpolating pairs of first label data of the first domain;
generating first label predictions via the machine learning system based on the intermediate sensor data; and
generating first domain loss data based on the intermediate label data with respect to the first label predictions,
wherein the final loss data includes the first domain loss data.

6. The computer implemented method of claim 1, further comprising:
generating intermediary sensor data by interpolating pairs of second sensor data of the second domain;
generating intermediary label data by interpolating pairs of second label data of the first domain;
generating second label predictions via the machine learning system based on the intermediary sensor data; and
generating second domain loss data based on the intermediary label data with respect to the second label predictions,
wherein the final loss data includes the second domain loss data.

7. The computer implemented method of claim 1, wherein the machine learning system is a convolutional neural network (CNN) or a long short-term memory (LSTM) network.

8. A system for domain adaptation, the system comprising:
a memory system including at least one non-transitory computer readable medium, the memory system storing a domain adaptation application and a machine learning system;
a processing system operatively connected to the memory system, the processing system including at least one processor that is configured to execute the domain adaptation application to implement a method that includes:
generating inter-domain sensor data by interpolating first sensor data of a first domain with respect to second sensor data of a second domain;
generating inter-domain label data by interpolating first label data of the first domain with respect to second label data of the second domain;
generating, via the machine learning system, inter-domain output data based on the inter-domain sensor data;
generating inter-domain loss data based on the inter-domain output data with respect to the inter-domain label data;
updating parameters of the machine learning system upon minimizing final loss data, the final loss data including at least the inter-domain loss data; and
generating, via the machine learning system, current label data that classifies current sensor data of the second domain.

9. The system of claim 8, wherein the processing system, upon executing the domain adaptation application, implements the method that includes:
obtaining a first encoded representation of the first sensor data and a second encoded representation of the second sensor data;
generating an intermediate encoded representation data by interpolating the first encoded representation with respect to the second encoded representation;
encoding the intermediate encoded representation data to generate a third encoded representation; and
generating regularizer loss data based on the third encoded representation with respect to the inter-domain sensor data,
wherein the final loss data includes the regularizer loss data.

10. The system of claim 8, wherein:
the machine learning system is trained to operate in the first domain; and
the second label data are predicted label data that are generated by the machine learning system in response to the second sensor data.

11. The system of claim 8, wherein the processing system, upon executing the domain adaptation application, implements the method that includes:
training a discriminator based on an encoded representation of the inter-domain sensor data and an encoded representation of the inter-domain label data; and
generating domain adversarial loss data based on output data from the discriminator,
wherein the final loss includes the domain adversarial loss data.

12. The system of claim 8, wherein the processing system, upon executing the domain adaptation application, implements the method that includes:
generating intermediate sensor data by interpolating pairs of first sensor data of the first domain;
generating intermediate label data by interpolating pairs of first label data of the first domain;
generating first label predictions via the machine learning system based on the intermediate sensor data; and
generating first domain loss data based on the intermediate label data with respect to the first label predictions,
wherein the final loss data includes the first domain loss data.

13. The system of claim 8, wherein the processing system, upon executing the domain adaptation application, implements the method that includes:
generating intermediary sensor data by interpolating pairs of second sensor data of the second domain;
generating intermediary label data by interpolating pairs of second label data of the first domain;
generating second label predictions via the machine learning system based on the intermediary sensor data; and
generating second domain loss data based on the intermediary label data with respect to the second label predictions,
wherein the final loss data includes the second domain loss data.

14. A non-transitory computer readable medium comprising computer readable data of a domain adaptation application that, when executed by a processing system with at least one processor, is configured to cause the processing system to implement a method that comprises:
generating inter-domain sensor data by interpolating first sensor data of a first domain with respect to second sensor data of a second domain;
generating inter-domain label data by interpolating first label data of the first domain with respect to second label data of the second domain;
generating, via a machine learning system, inter-domain output data based on the inter-domain sensor data;
generating inter-domain loss data based on the inter-domain output data with respect to the inter-domain label data;

updating parameters of the machine learning system upon minimizing final loss data, the final loss data including at least the inter-domain loss data; and generating, via the machine learning system, current label data that classifies current sensor data of the second domain.

15. The non-transitory computer readable medium of claim 14, wherein the method further comprises:
obtaining a first encoded representation of the first sensor data and a second encoded representation of the second sensor data;
generating an intermediate encoded representation data by interpolating the first encoded representation with respect to the second encoded representation;
encoding the intermediate encoded representation data to generate a third encoded representation; and
generating regularizer loss data based on the third encoded representation with respect to the inter-domain sensor data;
wherein the final loss data includes the regularizer loss data.

16. The non-transitory computer readable medium of claim 14, wherein:
the machine learning system is trained to operate in the first domain; and
the second label data are predicted label data that are generated by the machine learning system in response to the second sensor data.

17. The non-transitory computer readable medium of claim 14, wherein the method further comprises:
training a discriminator based on an encoded representation of the inter-domain sensor data and an encoded representation of the inter-domain label data; and
generating domain adversarial loss data based on output data from the discriminator,
wherein the final loss data includes the domain adversarial loss data.

18. The non-transitory computer readable medium of claim 14, wherein the method further comprises:
generating intermediate sensor data by interpolating pairs of first sensor data of the first domain;
generating intermediate label data by interpolating pairs of first label data of the first domain;
generating first label predictions via the machine learning system based on the intermediate sensor data; and
generating first domain loss data based on the intermediate label data with respect to the first label predictions,
wherein the final loss data includes the first domain loss data.

19. The non-transitory computer readable medium of claim 14, wherein the method further comprises:
generating intermediary sensor data by interpolating pairs of second sensor data of the second domain;
generating intermediary label data by interpolating pairs of second label data of the first domain;
generating second label predictions via the machine learning system based on the intermediary sensor data; and
generating second domain loss data based on the intermediary label data with respect to the second label predictions,
wherein the final loss includes the second domain loss data.

20. The non-transitory computer readable medium of claim 14, wherein the machine learning system is a convolutional neural network (CNN) or a long short-term memory (LSTM) network.

* * * * *